(12) United States Patent
Den Boer et al.

(10) Patent No.: US 11,099,474 B2
(45) Date of Patent: Aug. 24, 2021

(54) CAPACITIVE TOUCH PANEL HAVING DIFFUSER AND PATTERNED ELECTRODE

(71) Applicant: GUARDIAN GLASS, LLC, Auburn Hills, MI (US)

(72) Inventors: Willem Den Boer, Brighton, MI (US); Jason Blush, Milford, MI (US); Eric W. Akkashian, Waterford, MI (US)

(73) Assignee: GUARDIAN GLASS, LLC, Auburn Hills, MI (US)

( * ) Notice: Subject to any disclaimer, the term of this patent is extended or adjusted under 35 U.S.C. 154(b) by 0 days.

(21) Appl. No.: 16/747,012

(22) Filed: Jan. 20, 2020

(65) Prior Publication Data

US 2020/0225568 A1    Jul. 16, 2020

Related U.S. Application Data

(63) Continuation of application No. 15/891,494, filed on Feb. 8, 2018, now Pat. No. 10,539,864.

(51) Int. Cl.
*G03B 21/56* (2006.01)
*G06F 3/044* (2006.01)
*G03B 21/60* (2014.01)

(52) U.S. Cl.
CPC ............. *G03B 21/56* (2013.01); *G03B 21/60* (2013.01); *G06F 3/044* (2013.01); *G06F 2203/04112* (2013.01)

(58) Field of Classification Search
CPC ................... G09G 3/044; G09G 21/56; G06F 2203/04112
See application file for complete search history.

(56) References Cited

U.S. PATENT DOCUMENTS

| | | | |
|---|---|---|---|
| 5,254,413 | A | 10/1993 | Maricocchi |
| 5,736,975 | A | 4/1998 | Lunetta |
| 8,124,237 | B2 | 2/2012 | Nunez-Regueiro et al. |
| 8,138,425 | B2 | 3/2012 | Lee et al. |
| 8,173,263 | B2 | 5/2012 | Lingle et al. |

(Continued)

FOREIGN PATENT DOCUMENTS

| | | |
|---|---|---|
| CN | 102725714 A | 10/2012 |
| CN | 105677101 A | 6/2016 |

(Continued)

OTHER PUBLICATIONS

International Search Report and written opinion for International Application No. PCT/IB2019/051034, dated May 31, 2019, 11 pages.

(Continued)

*Primary Examiner* — Kevin M Nguyen (57) ABSTRACT

A projection screen including a capacitive touch panel, such as a projected capacitive touch panel. The touch panel includes first and second glass substrates, one of which is patterned (e.g., etched with acid or the like) to form a diffuser. A conductive coating is formed on the patterned surface of the diffuser glass substrate, and is patterned into a plurality of electrodes for the touch panel. The system, including an optional projector, may be used as an interactive transparent display for augmented reality applications such as storefronts. The touch panel may also be used in applications such as capacitive touch panels for controlling showers, appliances, vending machines, electronics, electronic devices, and/or the like.

16 Claims, 5 Drawing Sheets

(56) References Cited

U.S. PATENT DOCUMENTS

| | | |
|---|---|---|
| 8,187,713 B2 | 5/2012 | Lemmer et al. |
| 8,202,619 B2 | 6/2012 | Thomsen et al. |
| 8,203,073 B2 | 6/2012 | Lu et al. |
| 8,263,227 B2 | 9/2012 | Disteldorf et al. |
| 8,293,344 B2 | 10/2012 | Lemmer et al. |
| 8,313,620 B2 | 11/2012 | Krasnov |
| 9,354,755 B2 | 5/2016 | Den Boer et al. |
| 9,557,871 B2 | 1/2017 | Den Boer et al. |
| 9,733,779 B2 | 8/2017 | Veerasamy et al. |
| 9,740,357 B2 | 8/2017 | Den Boer et al. |
| 2004/0086723 A1 | 5/2004 | Thomsen |
| 2005/0083307 A1 | 4/2005 | Aufderheide et al. |
| 2008/0150913 A1 | 6/2008 | Bell et al. |
| 2009/0159344 A1 | 6/2009 | Hotelling et al. |
| 2009/0314621 A1 | 12/2009 | Hotelling |
| 2010/0013784 A1 | 1/2010 | Nashiki et al. |
| 2010/0046191 A1 | 2/2010 | Den Boer et al. |
| 2010/0163994 A1 | 7/2010 | Tang et al. |
| 2010/0209729 A1 | 8/2010 | Thomsen et al. |
| 2011/0012842 A1 | 1/2011 | Lee et al. |
| 2011/0193799 A1 | 8/2011 | Jun et al. |
| 2012/0114919 A1 | 5/2012 | Nakajima et al. |
| 2012/0118614 A1 | 5/2012 | Kuriki |
| 2012/0219821 A1 | 8/2012 | Frank et al. |
| 2012/0227259 A1 | 9/2012 | Badaye |
| 2014/0145999 A1 | 5/2014 | Den Boer et al. |
| 2015/0014023 A1 | 1/2015 | Kim et al. |
| 2015/0036066 A1 | 2/2015 | Chan et al. |
| 2016/0190055 A1 | 6/2016 | Jinbo et al. |
| 2016/0301900 A1 | 10/2016 | Liu |
| 2016/0377768 A1 | 12/2016 | Wilson et al. |
| 2017/0329166 A1 | 11/2017 | Akkashian et al. |
| 2017/0344157 A1 | 11/2017 | Krasnov et al. |
| 2018/0210118 A1 | 7/2018 | Gollier et al. |

FOREIGN PATENT DOCUMENTS

| | | |
|---|---|---|
| CN | 106484203 A | 3/2017 |
| CN | 107077249 A | 8/2017 |
| JP | 2010157239 A | 7/2010 |
| JP | 2012133779 A | 7/2012 |
| WO | 2012099253 A1 | 7/2012 |
| WO | 2012099394 A2 | 7/2012 |
| WO | 2012128893 A1 | 9/2012 |
| WO | 2016164427 A1 | 10/2016 |

OTHER PUBLICATIONS

Office Action received for CN Application No. 201980008423.9, dated Mar. 5, 2021, 21 Pages. (12 Pages of English Translation and 9 Pages of Official notification).

CAPACITIVE TOUCH PANEL HAVING DIFFUSER AND PATTERNED ELECTRODE

This application is a continuation of application Ser. No. 15/891,494, filed Feb. 8, 2018, the entire disclosure of which is hereby incorporated herein by reference in its entirety.

Example embodiments of this invention relate to a projection screen including a capacitive touch panel, such as a projected capacitive touch panel. The touch panel includes first and second glass substrates, one of which is patterned (e.g., etched with acid or the like) to form a diffuser. A conductive coating is formed on the patterned surface of the diffuser glass substrate, and is patterned into a plurality of electrodes for the touch panel. The system, including an optional projector, may be used as an interactive transparent display for augmented reality applications such as storefronts. The touch panel may also be used in applications such as capacitive touch panels for controlling showers, appliances, vending machines, electronics, electronic devices, and/or the like.

BACKGROUND

Transparent projection screens are known. Transparent projection screens have utilized two pieces of glass laminated to each other via an interlayer such as PVB. A diffusing surface has also been provided.

However, there is room for improvement in the art with respect to allowing interactive techniques to be used with projection screens.

SUMMARY OF EXAMPLE EMBODIMENTS

Example embodiments of this invention relate to a projection screen including a capacitive touch panel, such as a projected capacitive touch panel. The touch panel of the projection screen includes first and second glass substrates, one of which is patterned (e.g., etched with acid or the like) to form a diffuser. A conductive coating is formed on the patterned surface of the diffuser glass substrate, and is patterned into a plurality of electrodes for the touch panel. The system, including an optional projector, may be used as an interactive transparent display for augmented reality applications such as storefronts. The touch panel may also be used in applications such as capacitive touch panels for controlling showers, appliances, vending machines, electronics, electronic devices, and/or the like.

In certain example embodiments, the conductive coating used for the electrodes and/or traces of the touch panel may have improved conductivity (e.g., smaller sheet resistance $R_s$ or smaller emissivity, given a similar thickness and/or cost of deposition) compared to typical indium-tin-oxide (ITO) coatings. In certain example embodiments, the conductive coating may be a thin film of or including aluminum. In certain example embodiments, the conductive coating may be a thin film of or including NiCr. In certain example embodiments, the conductive coating may be a thin film of or including ITO. In certain example embodiments, the conductive coating may be a multi-layer conductive coating such as NiCr/Ag/NiCr. In certain example embodiments, the conductive coating may be a multi-layer conductive coating such as $Si_3N_4$/NiCr/Ag/NiCr/$Si_3N_4$, where the silver inclusive layer is conductive and the silicon nitride based layers (which may optionally be doped with aluminum and/or oxygen) are dielectric. The NiCr inclusive layers may be of or including NiCr, $NiCrO_x$, $NiCrN_x$, NiCrMo, $NiCrMoO_x$, $NiCrMoN_x$, or any combination thereof.

In an example embodiment of this invention, there is provided a projection screen capacitive touch panel comprising: first and second glass substrates; wherein a major first surface of the first glass substrate is acid etched to form a diffuse surface; a first patterned coating formed on the diffuse surface of the first glass substrate, wherein the first patterned coating comprises a conductive layer and is patterned into a plurality of electrodes of the touch panel, wherein the first patterned coating forms the electrodes and is formed on the acid etched diffuse surface to form a partially transparent diffuser on which an image can be projected from a projector; a processor configured for determining touch position on the touch panel via at least the electrodes; and wherein the first and second glass substrates are laminated to each other via a polymer inclusive laminating layer, wherein the diffuse surface of the first glass substrate faces the polymer inclusive laminating layer, and wherein the first patterned coating and the polymer inclusive laminating layer are located between the first and second glass substrates of the touch panel.

DETAILED DESCRIPTION OF EXEMPLARY EMBODIMENTS

A detailed description of exemplary embodiments is provided with reference to the accompanying drawings. Like reference numerals indicate like parts throughout the drawings.

Example embodiments of this invention relate to a projection screen including a capacitive touch panel, such as a projected capacitive touch panel 1. A transparent projection screen 1 may include a partially transparent diffuser inside a laminated glass assembly. The touch panel of the projection screen includes first and second glass substrates 3 and 5, laminated to each other via a polymer based interlayer 13 of a material such as PVB (polyvinyl butyral), EVA, Nitto OCA, SentryGlass Plus from DuPont, or the like. At least one of the glass substrates (e.g., glass substrate 3) is patterned by having been etched with acid or the like to form a diffuse surface 9 for a diffuser. The acid etched diffuse surface 9 may be in the form of, for example, Satin Deco glass Guardian Glass which has step pyramid glass structures with substantially flat tops, or acid etched glass from Guardian Glass which has rounded features from the etching and random diffuse reflection. The other glass substrate 5 is typically clear flat glass that is not acid-etched or otherwise patterned, optionally with an antireflection (AR) coating 15 on an outer surface thereof. A conductive coating 7 is formed on the patterned/etched surface 9 of the diffuser glass substrate 3, and the conductive coating 7 is patterned into a plurality of electrodes (e.g., see FIGS. 3-5) for the touch panel. Because the conductive coating 7 is formed on the etched surface 9 of the glass substrate 3, the conductive coating 7 may be substantially conformal to the peaks and valleys formed at the etched glass surface 9 from the etching. The diffuse surface (e.g., acid etched diffuse surface) 9 may have a surface roughness (Ra) of from 0.2 to 26 µm, more preferably from 0.4 to 3.2 µm, and most preferably from 1 to 3 µm, in certain example embodiments of this invention.

Figure 1:
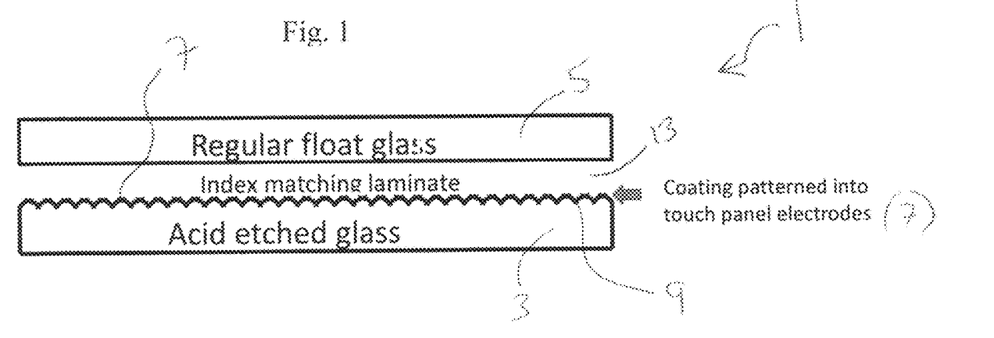
FIG. 1 is a side cross sectional view of a projection screen capacitive touch panel according to an example embodiments of this invention.

The conductive coating 7 may have a surface roughness, similar to that of the etched glass surface 9 used to form the diffuser. The projection screen touch panel preferably has a visible transmission (Ill. A, 2 deg. Obs.) of at least 50%, more preferably at least 60%.

Figure 2:
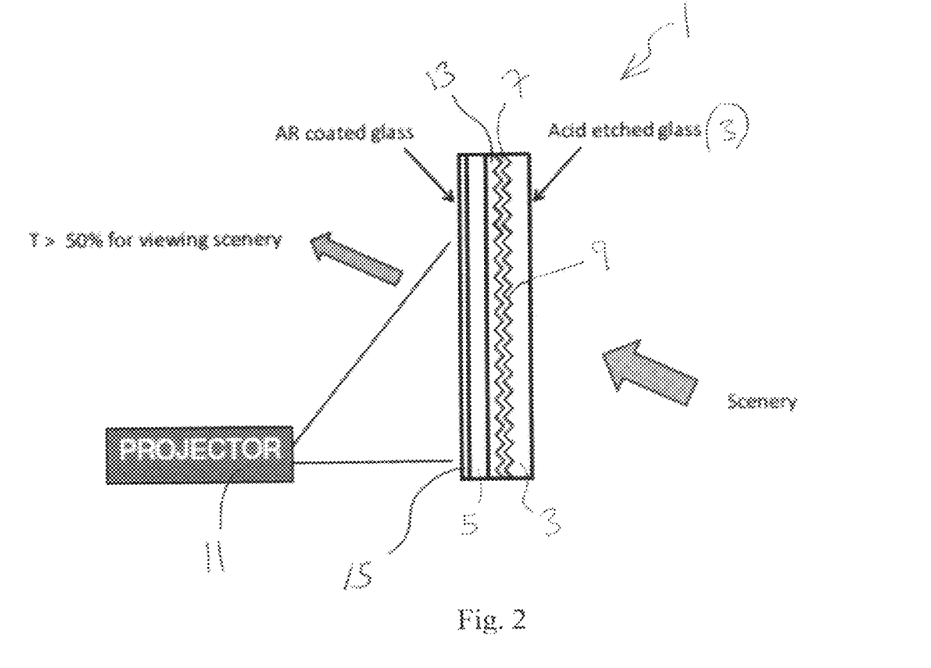
FIG. 2 is a perspective schematic view illustrating use and functionality of a projection screen capacitive touch panel according to an example embodiments of this invention.

Before lamination, the etched glass 3 with the thin coating 7 is substantially opaque because of scattering at the diffuse surface 9. After lamination with the index matching interlayer 13, the assembly becomes substantially clear or more clear in both transmission and reflection, so that have drops to less than 5% and objects behind the assembly can be clearly seen. The thickness of the conductive coating 7 may be optimized to transmit from about 50-70% of incident visible light, and so as to be partially transparent and have a visible reflectance of from about 20-40%. The conductive coating 7 on the etched surface 9 functions as an embedded, partially transparent diffuser on which an image can be projected from the projector 11. The acid etched pattern in the glass 3 and thin conductive coating 7 may be optimized for either rear projection or front projection, or both, in various example embodiments of this invention. Front projection, as an example, is shown in FIG. 2.

Touch and touch detection functionality can be achieved on the transparent projection screen by patterning the conductive coating 7 into electrodes and traces (e.g., see FIGS. 3-5) for a capacitive touch panel and connecting the terminals of the pattern at the periphery to a touch controller including a processor(s). The coating 7 may be patterned by photolithography, laser patterning, or the like.

The system, including an optional projector 11, may be used as an interactive transparent display for augmented reality applications such as storefronts. The touch panel 1 may also be used in applications such as capacitive touch panels for controlling showers, appliances, vending machines, electronics, electronic devices, and/or the like.

In certain example embodiments, the conductive coating 7 used for the electrodes and/or traces of the touch panel 1 may have improved conductivity (e.g., smaller sheet resistance $R_s$ or smaller emissivity, given a similar thickness and/or cost of deposition) compared to typical indium-tin-oxide (ITO) coatings. In certain example embodiments, the conductive coating 7 may be a thin film of or including aluminum, which may be from about 2-9 nm thick, more preferably from about 3-8 nm thick, and most preferably from about 4-6 nm thick in certain example embodiments. In certain example embodiments, the conductive coating 7 may be a thin film of or including NiCr. In certain example embodiments, the conductive coating 7 may be a thin film of or including ITO. In certain example embodiments, the conductive coating 7 may be a multi-layer conductive coating such as NiCr/Ag/NiCr. In certain example embodiments, the conductive coating 7 may be a multi-layer conductive coating such as $Si_3N_4$/NiCr/Ag/NiCr/$Si_3N_4$, where the silver inclusive layer is conductive and the silicon nitride based layers (which may optionally be doped with aluminum and/or oxygen) are dielectric. The NiCr inclusive layers may be of or including NiCr, $NiCrO_x$, $NiCrN_x$, NiCrMo, $NiCrMoO_x$, $NiCrMoN_x$, or any combination thereof. Any of the coatings shown and/or described in any of U.S. Pat. Nos. 9,740,357; 9,733,779, 9,354,755, 9,557,871, 2017/0329166, and 2017/0344157, all incorporated herein by reference in their entireties, may also be used as the patterned coating 7, that is patterned into the touch panel electrodes and/or traces, in embodiments of this invention.

The capacitive touch panel includes an insulator such as glass 3 coated with conductive coating 7. As the human body is also an electrical conductor, touching the surface of the panel results in a distortion of the panel's electrostatic field, measurable as a change in capacitance for example. A transparent touch panel may be combined with a display such as a liquid crystal display (LCD) or LED panel to form a touchscreen. A projected capacitive (PROCAP) touch panel, which may optionally include an LCD or other display, may allow finger or other touches to be sensed through a protective layer(s) in front of the conductive coating 7.

Figure 3:
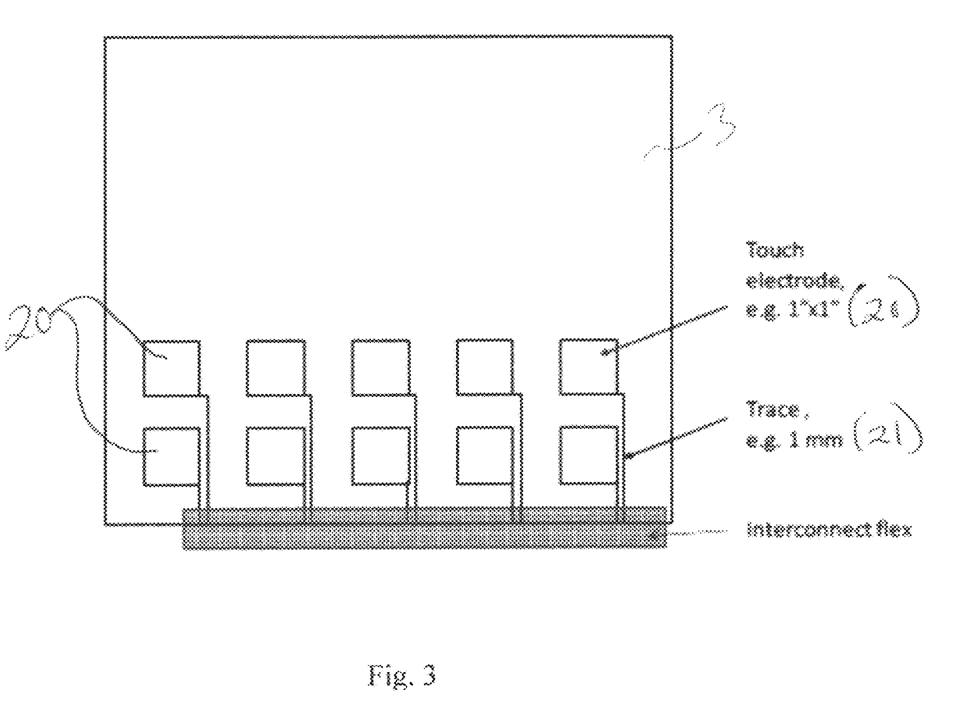
FIG. 3 is a top or bottom view of an electrode/trace layout for the projection screen capacitive touch panel of FIG. 1 and/or FIG. 2 according to an example embodiments of this invention.

FIG. 3 is a top or bottom view of an electrode/trace layout for the projection screen capacitive touch panel of FIG. 1 and/or FIG. 2 according to an example embodiments of this invention, where the conductive coating 7 is patterned into a plurality of conductive electrodes 20 and conductive traces 21 for the touch panel. In the FIG. 3 embodiments, the coating 7 may be patterned into a plurality of individual electrodes 20 as touch buttons, and traces 21, that cover a large portion of glass substrate 3.

Figure 4:
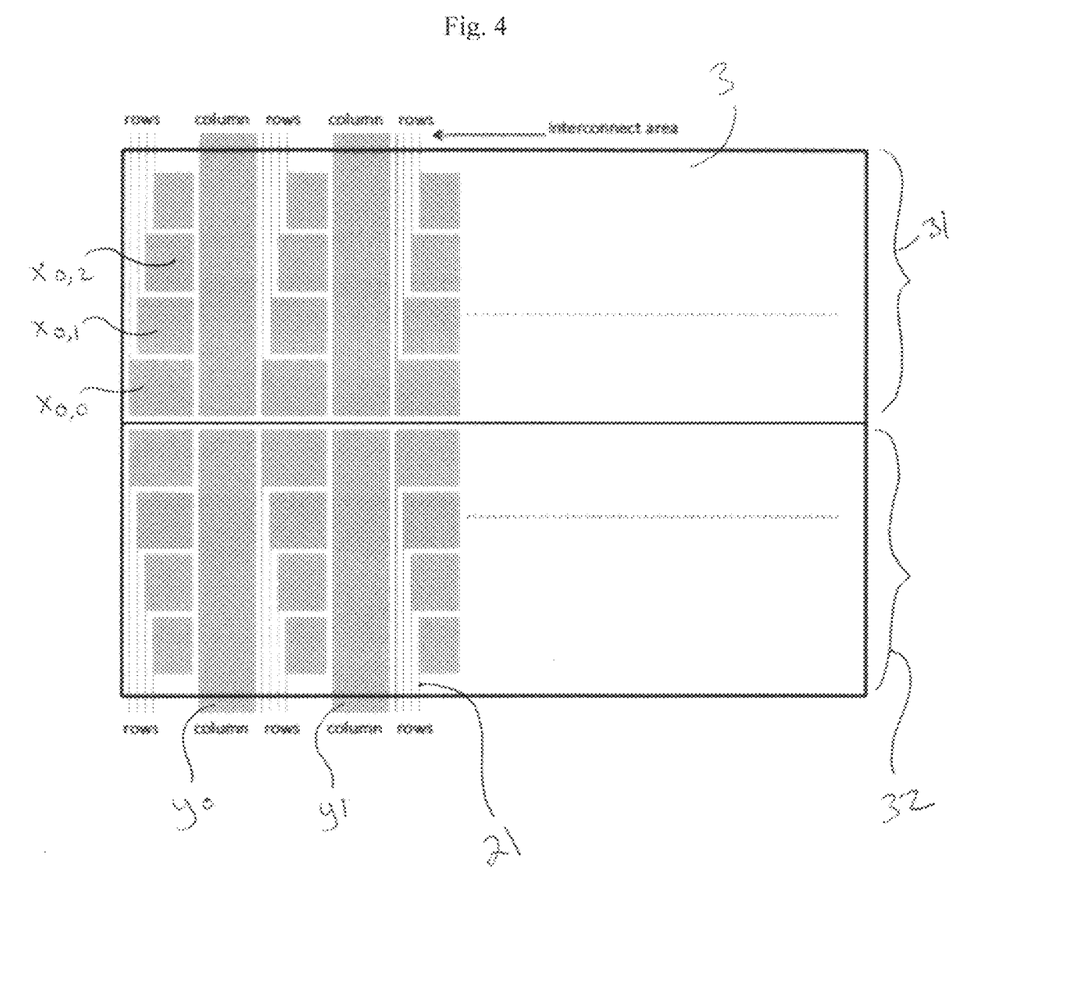
FIG. 4 is a top or bottom view of another example electrode/trace layout for the projection screen capacitive touch panel of FIG. 1 and/or FIG. 2 according to an example embodiments of this invention.

FIG. 4 is a top or bottom view of another example electrode/trace layout for the projection screen capacitive touch panel of FIG. 1 and/or FIG. 2 according to an example embodiments of this invention, showing another way in which the conductive coating 7 may be patterned to form touch panel circuitry in a caterpillar pattern for instance. FIG. 4 illustrates a top or bottom plan layout of a projected capacitive touch panel according to an exemplary embodiment, that may contain the coating 7 patterned into electrodes and traces. The touch panel includes a matrix of electrodes x, y including n columns and m rows, provided on etched substrate 3. The matrix of row/column electrodes x, y formed by the conductive coating 7 may be provided on the side of the substrate 3 that is opposite the side touched by person(s) using the touch panel, in order to prevent corrosion of the patterned coating 7 by human finger touches, in certain example embodiments. In other words, when the touch panel is touched by a finger, stylus, or the like, the glass substrate 3 may be located between (a) the finger and (b) the matrix of row/column electrodes x, y and conductive traces 21. Change in capacitance between adjacent row and column electrodes formed by coating 7 in the matrix as a result of the proximity of a finger or the like is sensed by the electronic circuitry, and the connected circuitry can thus detect where the panel is being touched by a finger or the like. For example, row 0 includes row electrodes $x_{0,0}$, $x_{1,0}$, $x_{2,0}$, etc., through $x_{n,0}$ and columns 0, 1 and 2 respectively include column electrodes $y_0$, $y_1$, $y_2$, etc., through $y_n$. Optionally, the x electrodes in a column direction may also be grouped for column sensing. The number of row and column electrodes is determined by the size and resolution of the touch panel. In this example, the top-right row electrode may be $x_{n,m}$. Each row electrode $x_{0,0}$-$x_{n,m}$ of the touch panel is electrically connected to an interconnect area (e.g., at the periphery of the panel, at one or more sides) and corresponding processing circuitry/software by a conductive trace 21. Each column electrode $y_0$-$y_n$ is also electrically connected to an interconnect area and corresponding processing circuitry/software, either directly or by a conductive trace. The conductive traces 21 are preferably formed of the same transparent conductive material 7 as the row and column electrodes. Thus, in certain example embodiments, the matrix of row and column electrodes x, y and corresponding traces can be formed by sputter-depositing the coating 7 on the etched surface of glass substrate 3 and then performing a small number of photolithography, laser patterning, and/or other patterning process(es) in order to pattern the coating 7 into the conductive electrodes x, y and/or conductive traces. Because the row electrodes $x_{0,0}$-$x_{n,m}$, column electrodes $y_0$-$y_n$, and traces do not overlap as viewed from above/below in the FIG. 4 embodiment, the row electrodes $x_{0,0}$-$x_{n,m}$, column electrodes $y_0$-$y_n$, and traces 21 may be formed on the same plane parallel (or substantially parallel) to glass substrate 3 on which the electrodes and traces are formed. In the touch panel of FIG. 4, there is a capacitance between each row electrode and the adjacent column electrode (for example, between row electrode $x_{0,0}$ and column electrode $y_0$). This capacitance can be measured by applying a voltage to a column electrode (for example, column electrode $y_0$) and measuring the voltage of an adjacent row electrode (for example, row electrode $x_{0,0}$). When a user brings a finger or conductive stylus close to the touch panel, changes in the local electrostatic field reduce the mutual capacitance. Thus, one may be considered a transmit electrode $y_0$ and the other a receive electrode $x_{0,0}$. The capacitance change at individual points on the surface can be measured by measuring each pair of row electrodes and column electrodes in sequence. The traces 21 of each row electrode in the same row (for example, the traces of row electrodes $x_{0,0}$, $x_{1,0}$, $x_{2,0}$, etc., through $x_{n,0}$ of row 0) may be electrically connected together. The same capacitance may be measured by applying a voltage to a row electrode and measuring the voltage on an adjacent column electrode rather than applying a voltage to a column electrode and measuring the voltage of an adjacent row electrode. Signal processing (for example, applying and measuring voltages, measuring the capacitance between adjacent electrodes, measuring changes in capacitance over time, outputting signals in response to user inputs, etc.) may be performed by a signal processor. The signal processor may be one or more hardware processors, may include volatile or non-volatile memory, and may include computer-readable instructions for executing the signal processing. The signal processor may be electrically connected to the column electrodes $y_0$-$y_n$ and electrically connected to the row electrodes $x_{0,0}$-$x_{n,m}$ through the traces 21. FIG. 4 also shows that the touch panel electrodes may be divided into upper section 31 and lower section 32, each of which includes a matrix of electrodes x, y including n columns and m rows. There is a capacitance between each row electrode and the adjacent column electrode which may be measured by applying a voltage to a column electrode and measuring the voltage of an adjacent row electrode (or, alternatively, by applying a voltage to a row electrode and measuring the voltage of an adjacent column electrode). When a user brings a finger or conductive stylus close to the touch panel, changes in the local electrostatic field reduce the mutual capacitance. The capacitance change at individual points on the surface can be measured by measuring the mutual capacitance of each pair of row electrodes and column electrodes in sequence.

Figure 5:
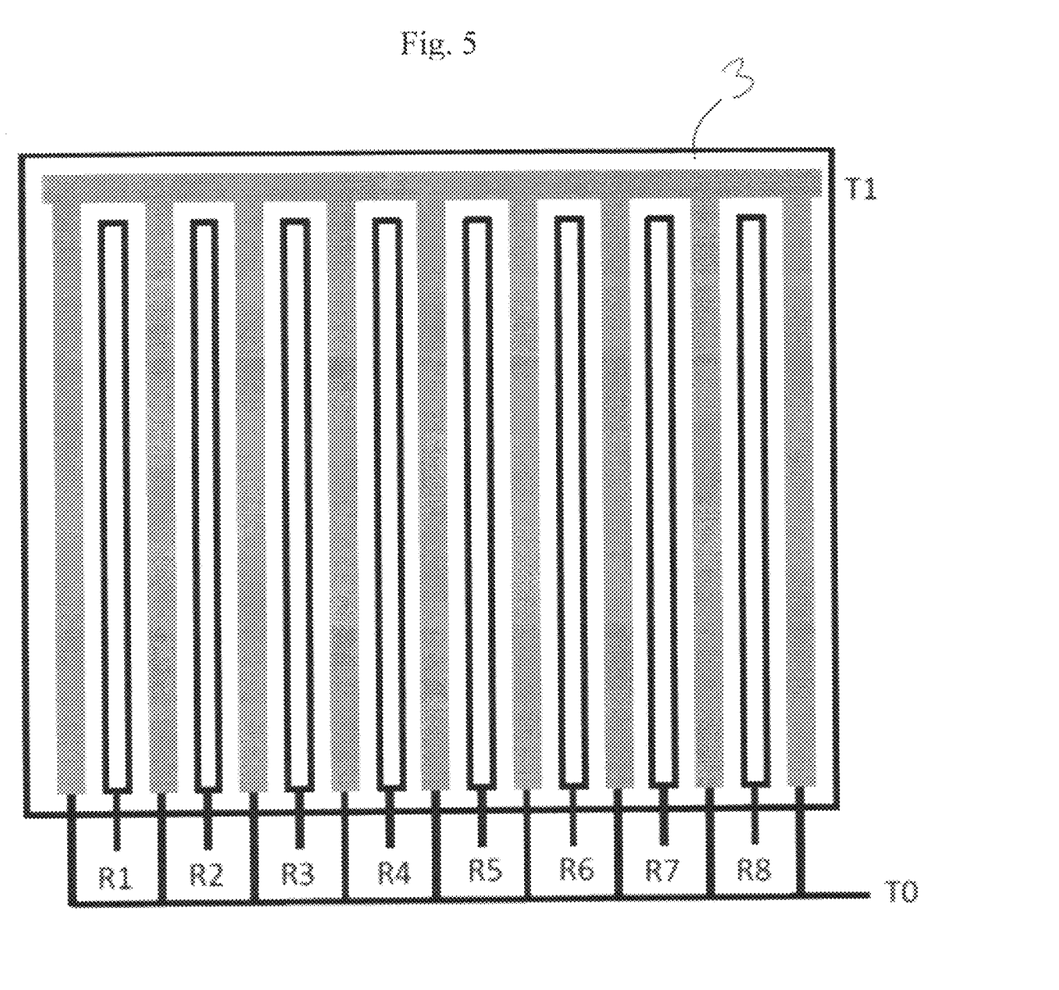
FIG. 5 is a top or bottom view of another example electrode/trace layout for the projection screen capacitive touch panel of FIG. 1 and/or FIG. 2 according to an example embodiments of this invention.

FIG. 5 is a top or bottom view of another example electrode/trace layout for the projection screen capacitive touch panel of FIG. 1 and/or FIG. 2 according to an example embodiments of this invention, showing another way in which the conductive coating 7 may be patterned to form touch panel circuitry. The conductive coating 7 on the etched surface of substrate 3 is patterned into transmit (T) and receive (R) electrodes, which may be in the same plane in the FIG. 5 embodiment. The gradient sensor touch pattern may operate by applying the same pulse signal to all (T) striped transmit electrodes on one side of the panel (e.g., T1), while the touch electrodes are connected to ground on the other side (e.g., T0). This creates a gradient in the pulse amplitude, which upon touch can be detected by the processor as the Y coordinate by the receive (Rn) electrodes. The X coordinate is based on the location of touch with respect to the individual receive electrodes (Rn), which may each be connected to separate amplifiers. The actual distance between the patterned thin electrodes may be from about 20-100 μm in certain example embodiments, so that the pattern may have low visibility when projecting an image on the embedded diffuser screen.

Figure 6:
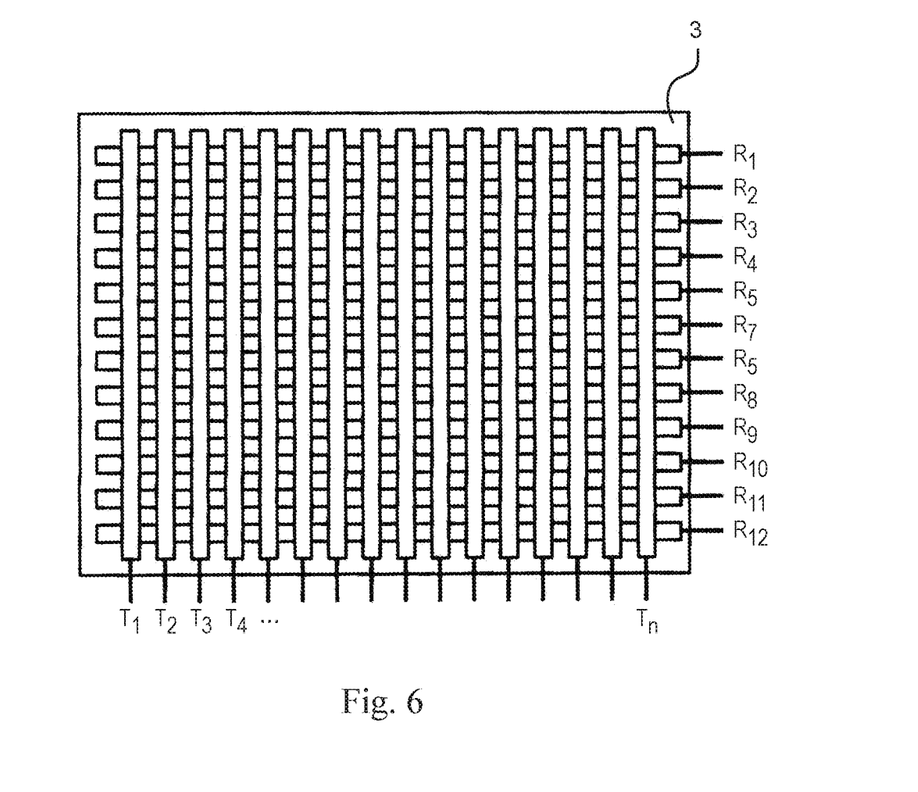
FIG. 6 is a top or bottom view of another example electrode/trace layout for the projection screen capacitive touch panel of FIG. 1 and/or FIG. 2 according to an example embodiments of this invention.

FIG. 6 is a top or bottom view of another example electrode/trace layout for the projection screen capacitive touch panel of FIG. 1 and/or FIG. 2 according to an example embodiments of this invention, showing another way in which the conductive coating 7 may be patterned to form touch panel circuitry, including electrodes on different planes which may be made out of different conductive coatings 7. The touch panel includes transmit electrodes (T) and receive (R) electrodes similar to the FIG. 5 embodiment, except that the transmit electrodes (T) are orthogonal to the receive electrodes (R) and may be on a different plane and may be formed from a different coating 7. For example, a first coating 7, such as aluminum for instance, on the etched surface 9 could be patterned into a plurality of receive electrodes that are parallel to each other and extend in the X direction as shown in FIG. 6. Then, a second coating 7 could be deposited over the patterned first coating, with the second coating 7 then being patterned into a plurality of transmit electrodes that are parallel to each other and extend in the Y direction, as shown in FIG. 6. The second coating 7 may be formed of aluminum, or may be any of the silver inclusive coatings shown and/or described in any of U.S. Pat. Nos. 9,740,357; 9,733,779, 9,354,755, 9,557,871, 2017/0329166, and 2017/0344157, all incorporated herein by reference in their entireties. The first and second coatings 7 may be separated by a laminating layer such as PVB, EVA, or any of the other laminating materials mentioned herein. Thus, the X electrodes and the Y electrodes may be formed of different materials, and be in different planes, in this example embodiment.

In an example embodiment of this invention, there is provided a projection screen capacitive touch panel comprising: first and second glass substrates; wherein a major first surface of the first glass substrate is acid etched to form a diffuse surface; a first patterned coating formed on the diffuse surface of the first glass substrate, wherein the first patterned coating comprises a conductive layer and is patterned into a plurality of electrodes of the touch panel, wherein the first patterned coating forms the electrodes and is formed on the acid etched diffuse surface to form a partially transparent diffuser on which an image can be projected from a projector; a processor configured for determining touch position on the touch panel via at least the electrodes; and wherein the first and second glass substrates are laminated to each other via a polymer inclusive laminating layer, wherein the diffuse surface of the first glass substrate faces the polymer inclusive laminating layer, and wherein the first patterned coating and the polymer inclusive laminating layer are located between the first and second glass substrates of the touch panel. The touch panel need not be a projection type panel in certain example embodiments.

In the projection screen capacitive touch panel of the immediately preceding paragraph, the conductive layer may be of or include aluminum.

In the projection screen capacitive touch panel of any of the preceding two paragraphs, the coating may comprise a layer comprising silver and first and second dielectric layers, wherein the layer comprising silver is the conductive layer and is located between at least first and second dielectric layers.

In the projection screen capacitive touch panel of any of the preceding three paragraphs, the first coating may be substantially conformal to peaks and valleys formed in the acid etched diffuse surface.

In the projection screen capacitive touch panel of any of the preceding four paragraphs, the electrodes may comprise transmit electrodes and/or receive electrodes.

In the projection screen capacitive touch panel of any of the preceding five paragraphs, the panel may further comprise an antireflective coating provided on the second glass substrate, wherein the antireflective coating is preferably not located between the first and second glass substrates.

In the projection screen capacitive touch panel of any of the preceding six paragraphs, the polymer inclusive laminating layer may comprises polyvinyl butyral.

In the projection screen capacitive touch panel of any of the preceding seven paragraphs, the second glass substrate is preferably not acid etched.

In the projection screen capacitive touch panel of any of the preceding eight paragraphs, the first coating may have a visible transmission of from about 50-70%.

In the projection screen capacitive touch panel of any of the preceding nine paragraphs, the first coating may be partially reflective.

In the projection screen capacitive touch panel of any of the preceding ten paragraphs, the touch panel may have a visible reflectance of from about 20-40%.

In the projection screen capacitive touch panel of any of the preceding eleven paragraphs, the first coating may have a visible reflectance of from about 15-45%, more preferably from about 20-40%.

In the projection screen capacitive touch panel of any of the preceding twelve paragraphs, the polymer inclusive laminating layer may have a refractive index (n, at 550 nm) of from about 1.47 to 1.55.

In the projection screen capacitive touch panel of any of the preceding thirteen paragraphs, the first coating may have a sheet resistance of less than or equal to about 40 ohms/square.

In the projection screen capacitive touch panel of any of the preceding fourteen paragraphs, the projection screen capacitive touch panel may be configured to be used as an interactive transparent display for an augmented reality application, such as at a storefront.

In the projection screen capacitive touch panel of any of the preceding fifteen paragraphs, the panel may further comprise a second patterned coating formed on the diffuse surface of the first glass substrate, wherein the second patterned coating may comprises a conductive layer and may be patterned into a plurality of second electrodes of the touch panel. The second electrodes formed by the second coating may overlap the electrodes formed by the first coating (or vice versa), and the electrodes formed by the first and second coatings are preferably configured to allow the processor to determine position on the touch panel. The first and second coatings may be different, such as when the first coating comprises a conductive layer comprising aluminum and the second coating comprising a conducive layer comprising silver. There may be another polymer inclusive laminating layer (e.g., PVB or EVA) provided between at least the first and second coatings.

In the projection screen capacitive touch panel of any of the preceding sixteen paragraphs, the diffuse surface (e.g., acid etched diffuse surface) may have an average surface roughness (Ra) of from 0.2 to 26 µm, more preferably from 0.4 to 3.2 µm, and most preferably from 1 to 3 µm.

The forgoing exemplary embodiments are intended to provide an understanding of the disclosure to one of ordinary skill in the art. The forgoing description is not intended to limit the inventive concept described in this application, the scope of which is defined in the following claims.

What is claimed is:

1. A capacitive touch panel, comprising:
   first and second glass substrates;
   wherein a major first surface of the first glass substrate is acid etched to form a diffuse surface;
   a first coating formed on the diffuse surface of the first glass substrate, wherein the first coating comprises a conductive layer and at least one electrode of the touch panel, wherein the first coating forms the at least one electrode and is formed on the acid etched diffuse surface to form a partially transparent diffuser;
   a processor configured for determining touch position on the touch panel via the at least one electrode; and
   wherein the first and second glass substrates are laminated to each other via a polymer inclusive laminating layer, wherein the diffuse surface of the first glass substrate faces the polymer inclusive laminating layer, and wherein the first coating and the polymer inclusive laminating layer are located between the first and second glass substrates of the touch panel.

2. The capacitive touch panel of claim 1, wherein the conductive layer comprises aluminum.

3. The capacitive touch panel of claim 1, wherein the first coating is substantially conformal to peaks and valleys formed in the acid etched diffuse surface.

4. The capacitive touch panel of claim 1, further comprising an antireflective coating provided on the second glass substrate, wherein the antireflective coating is not located between the first and second glass substrates.

5. The capacitive touch panel of claim 1, wherein the polymer inclusive laminating layer comprises polyvinyl butyral.

6. The capacitive touch panel of claim 1, wherein the second glass substrate is not acid etched.

7. The capacitive touch panel of claim 1, wherein the first coating has a visible transmission of from about 50-70%.

8. The capacitive touch panel of claim 7, wherein the first coating is partially reflective.

9. The capacitive touch panel of claim 8, wherein the touch panel has a visible reflectance of from about 20-40%.

10. The capacitive touch panel of claim 1, wherein the first coating has a visible reflectance of from about 15-45%.

11. The capacitive touch panel of claim 1, wherein the first coating has a sheet resistance of less than or equal to about 40 ohms/square.

12. The capacitive touch panel of claim 1, wherein the projection screen capacitive touch panel is configured to be used as an interactive transparent display for an augmented reality application.

13. The capacitive touch panel of claim 1, wherein the conductive layer comprises one or more of Ag, NiCr, Al, or ITO.

14. The capacitive touch panel of claim 1, further comprising a second coating formed on the diffuse surface of the first glass substrate, wherein the second coating comprises a conductive layer and is patterned into a plurality of second electrodes of the touch panel.

15. The capacitive touch panel of claim 1, wherein the diffuse surface has an average surface roughness of from 0.2 to 26 μm.

16. The capacitive touch panel of claim 1, wherein the diffuse surface has an average surface roughness of from 0.4 to 3.2 μm.

\* \* \* \* \*